United States Patent [19]
Leonard

[11] 3,726,496
[45] Apr. 10, 1973

[54] TRIDIRECTIONAL ACTUATOR

[75] Inventor: John P. Leonard, Huntsville, Ala.

[73] Assignee: The United States of America as represented by the Secretary of the Army

[22] Filed: Aug. 4, 1971

[21] Appl. No.: 168,882

[52] U.S. Cl. ............... 244/3.22, 60/229, 239/265.23
[51] Int. Cl. ........................... F41g 7/00, B63h 25/46
[58] Field of Search ................. 244/3.15, 3.20, 3.21, 244/3.22; 60/229; 239/265.19, 265.23, 265.27, 265.39; 137/81.5

[56] References Cited

UNITED STATES PATENTS

| | | |
|---|---|---|
| 3,273,801 | 9/1966 | Wilhite .......................... 239/265.23 |
| 3,278,140 | 10/1966 | Evans ................................ 244/3.22 |
| 2,974,594 | 3/1961 | Boehm .............................. 60/229 X |

Primary Examiner—Benjamin A. Borchelt
Assistant Examiner—James M. Hanley
Attorney—Harry M. Saragovitz et al.

[57] ABSTRACT

The device is a portion of a missile control system used to generate the forces to change missile attitude. A three channel fluid amplifier with its exits located at 120° intervals around the missile body in a plane orthogonal to the long axis is the motive device. It is controlled by a single, electrically driven port venting mechanism, which is energized by an electronically generated sequence of pulses. These switching pulses are formed to produce a proper force time product in the pitch and yaw planes without cross coupling.

2 Claims, 7 Drawing Figures

PATENTED APR 10 1973 3,726,496

John P. Leonard,
INVENTOR.

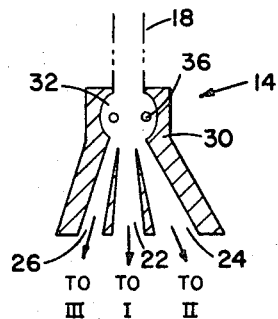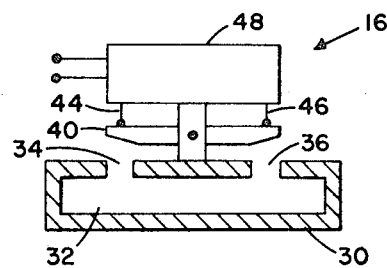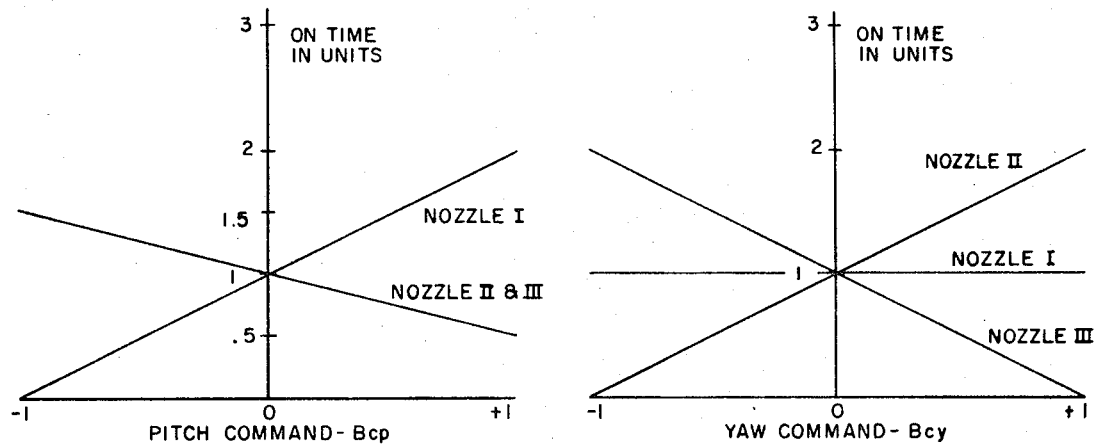
FIG. 5

| SEQUENCE | INPUT TO VENT CONTROL MECHANISM | MISSILE PLANE CONTROLLED | ON TIME (STANDARD UNITS) |
|---|---|---|---|
| III | − | P | $1-.5\,Bcp$ |
| I | 0 | Y | 1 |
| II | + | P | $1-.5\,Bcp$ |
| II | + | Y | $1+Bcy$ |
| I | 0 | P | $1+Bcp$ |
| III | − | Y | $1-Bcy$ |

John P. Leonard,
INVENTOR.

TRIDIRECTIONAL ACTUATOR

BACKGROUND OF THE INVENTION

One of the obstacles to the attainment of cheap missiles is the inherent cost of the mechanism which are required to generate the forces for control of the missiles flight path. These mechanisms which, as a general category can be called actuators, normally are used in combinations of two, three, or four devices for a single missile. The device described herein attacks the cost problem in two ways: first, a low cost fluidic mechanism is utilized to control the flow of gases; second, only one such mechanism is required to control the missile in both pitch and yaw planes. The basic flow control mechanism can be used to control flows of bottled gases as a direct reaction jet system or injectants to operate as a secondary injection mechanism.

BRIEF DESCRIPTION OF THE DRAWINGS

FIG. 3 is a schematic representation of the tridirectional fluidic mechanism.

FIG. 4 is a schematic representation of the vent control valve assembly used in conjunction with the tridirectional fluidic mechanism of the subject invention.

FIG. 5 is a graphic representation of the distribution of on time intervals for the pitch and yaw channels.

DETAILED DESCRIPTION OF THE INVENTION

Figure 1:
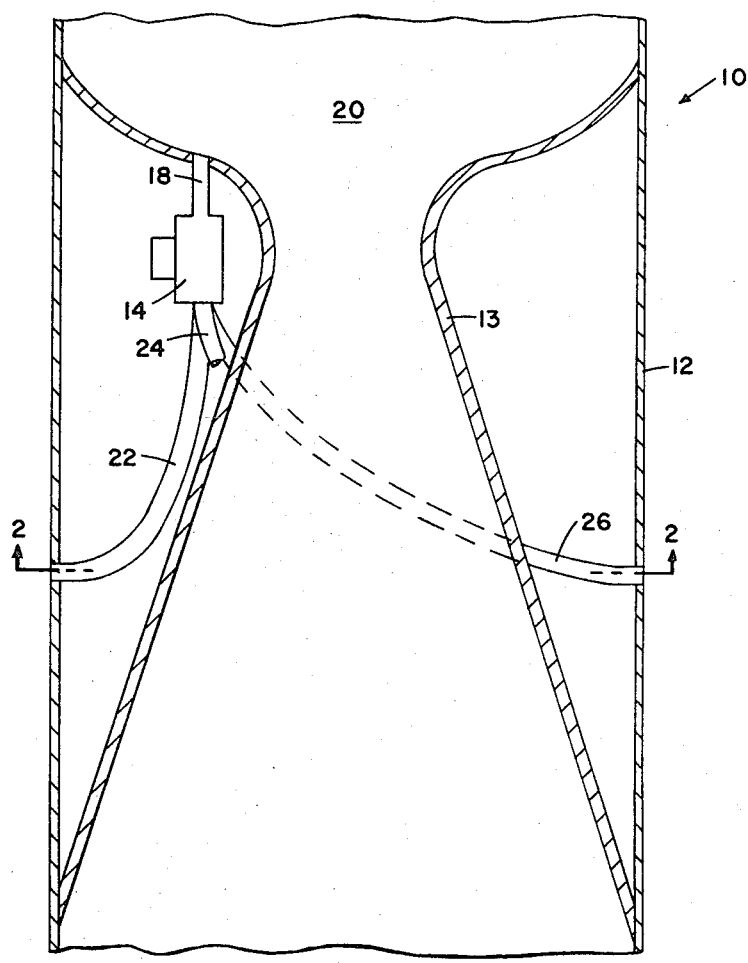
FIG. 1 is a schematic representation of the rear end of a missile showing the main nozzle and the manner in which the subject invention is incorporated therein.
Figure 2:
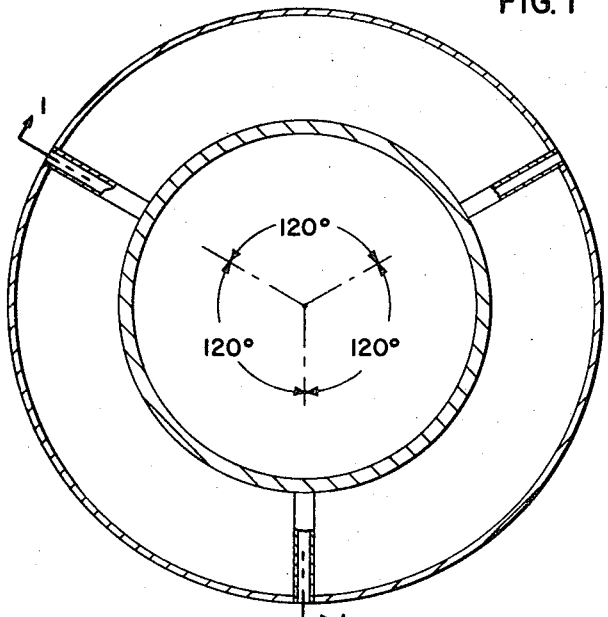
FIG. 2 is a schematic section of the rear end of a missile taken on 2—2 of FIG. 1 and illustrates the directional forces applied by the gas flow from the present invention.

Referring now to the drawings, and particularly FIG. 1, wherein, 10 generally indicates the rear portion of a missile incorporating the invention. The missile portion shown comprises the missile skin 12 and an exhaust nozzle 13. Between the nozzle 13 and the missile skin 12 is a fluidic control mechanism 14 and a vent control mechanism 16 therefor. The fluidic control mechanism 14 is provided with an inlet duct 18 communicating either with the high pressure gas in the motor chamber 20 of the missile as with a gas bottle not shown. Three outlet ports from the fluidic control mechanism 14 are connected by ducts 22, 24 and 26 respectively, to three outlet ports I, II and III located in the missile skin 12 adjacent the rear end of the missile at points spaced 120° around the periphery thereof as illustrated in FIG. 2.

Turning now to FIGS. 3 and 4, the fluidic control mechanism 14 comprises a housing 30 having a chamber 32 formed therein. The chamber 32 is connected on one side to inlet duct 18 and on the other side to outlet ducts 22, 24 and 26. Two vent ports 34 and 36 control the flow of fluid through the chamber 32 to selectively direct flow to the outlet ducts 22, 24 and 26.

The vent control mechanism 16 comprises a flapper valve 40 pivotally mounted at 42 at a point midway between ports 34 and 36 whereby rocking motion of the flapper valve may selectively close one or the other of the vent ports 34 and 36. Two plungers 44 and 46 are connected adjacent the opposite ends of flapper valve 40 and extend into a solenoid coil mechanism 48. Application of a positive voltage will cause the flapper valve 40 to rock in one direction to close one vent port, while a negative voltage applied will cause the flapper valve 40 to rock in the opposite direction to close the other vent port. A neutral, or zero voltage, allows both vent ports to remain open.

The control force and time integral achieved with this mechanism is linearly variable in the positive and negative directions over a standard switching sequence in response to two electrical commands $Bcp$ and $Bcy$, which are respectively the commanded force time integral in the missile pitch direction and the commanded force and time integral in the missile yaw direction. The mechanism responds independently to each of these command signals.

A standard switching sequence consists of six standard time units. Three of these units are assigned for control in the pitch direction and three in the yaw direction. In response to any value of $Bcp$ or $Bcy$, the full three units of on time are used, but the distribution of on time between exhaust channels is adjusted such that the vector sum of "thrust-on-time" product lies in the desired control plane, and is linearly proportional in magnitude to the command in that plane.

FIG. 5 represents the on time for each exhaust as a function of $Bcp$ and $Bcy$. A standard switching sequence occurs in the order III, I, II, II, I, III. With zero inputs, i.e., $Bcp = 0$, $Bcy = 0$, the exhaust flows dwells for one time unit in each position in the sequence. Note that each position occurs twice in the sequence, and further, that it can be considered to consist of two sequences interleaved, namely, III, II, I and I, II, III. The first sequence is assigned to control of the pitch plane, while the second is assigned to yaw. The distribution of dwell times in each part of the sequence is in accord with FIG. 5 and FIG. 6.

The switching logic required to sequence the actuator is readily achievable, using circuits composed of relays and operational amplifiers. The critical portion of a mechanization with electronic components is presented in FIG. 7. This figure is organized to illustrate function only. The circuit must be modified for actual components used. It is also possible to mechanize a device using fluidic elements if $Bcp$ and $Bcy$ are fluidic rather than electrical signals.

The electronic mechanization functions as follows: Immediately prior to initiation of a standard sequence, i.e., closure of contact a, the signals $Bcp$ and $Bcy$ are sampled. The circuit to achieve this function is not shown. Voltages proportional to $0.5\ Bcp$, $(Bcy - 0.5\ Bcp)$, $Bcp$ and $-Bcy$ are formed and stored.

Figures 6, 7:
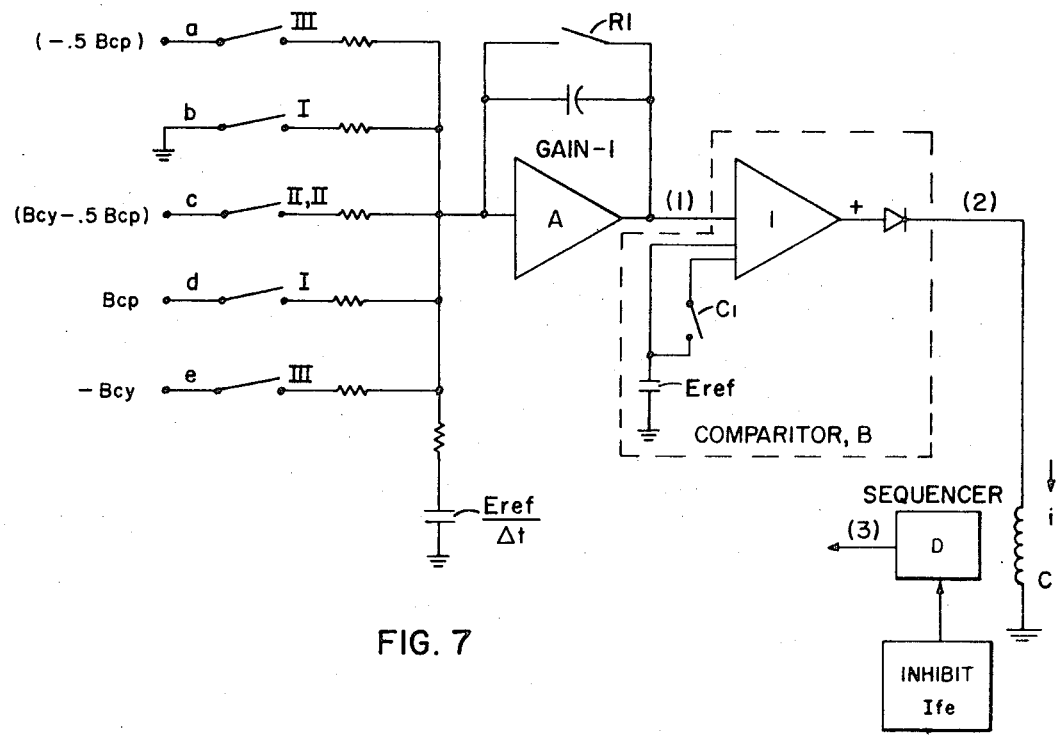
FIG. 6 is a tabular representation of the on time intervals and the electrical control for the vent valve mechanism.
FIG. 7 is a schematic representation of the electrical circuits associated with the controls for the vent valve assembly.

Starting from the right of FIG. 7 and working towards the left, when a current I flows into coil C, the voltage state of the output of D, (3) is changed from its initial value to a subsequent value in the sequence $-$, 0, $+$, 0, $-$, $+$. Only one change occurs for each current surge through the coil. An inhibit circuit prevents a change of state on (3) if relay C is closed. In addition, each time a current flow occurs, the capacitor around A is momentarily shorted by R1, and the input contacts are sequenced, i.e., the closed contact is opened and the next in the sequence closed in the order $a, b, c, d, e, a, b, c$, etc. Contact C1 is closed whenever $c$ is closed.

Comparator B compares the voltage output of integrator A on line (1) with a reference voltage E reference. When voltage at (1) is positive and exceeds E reference in magnitude, a current is delivered to coil 1. If contact C1 is closed, the voltage at (1) must exceed 2 times E reference.

In the absence of an input signal, (E reference)$/t$, will be integrated and achieve voltage output adequate to trip the comparator in $\Delta t$ seconds. In the presence of a signal, integration time to achieve trip voltage will be linearly increased by a positive input signal and decreased by a negative one. The state of switches $a$ through $e$, determine which signal modulates the time between switching and thus controls the time that $-, 0$, or $+$ voltage is issued from the sequencer at D. The state of this voltage determines the state of the vent control mechanism, which, in turn, controls the channel through which fluid exhausts from the actuator.

The logic for the tridirectional actuator is as follows:

1. Flow must be switched from exhaust III to I and thence to II. Flow may not be switched directly from II to III or III to II. This restriction is imposed by the fluidic mechanism. This does not preclude a zero or almost zero dwell time in any position.

2. If a cycle time of six units duration is allocated to complete one control cycle in pitch and yaw, then for any Bcp or Bcy three units of time must be used for control of either pitch or yaw plane. No more or less.

3. A standard sequence of states will be assumed such that flow is switched from exhaust III to exhaust I to exhaust II to exhaust I to exhaust III. Dwell times in each position will be divided such that the sequence III, I, II, II, I, III will be divided into two sub sequences III, II, I and I, II, III. Dwell time in the first sub sequence will be determined by a pitch plane command, and no force time product will be contributed to the yaw control plane. Dwell time in the second sub sequence will be determined by the yaw command, and no force time product will be contributed to the pitch control plane.

It should be noted that this restriction eliminates coupling of the planes in a non rolling missile.

Consider the following signal inputs:

a. $Bcp = 0$. Exhaust channels III, II and I are each on for one unit of time. (3 units of time total)
Force time product, pitch $= 1 + (0.5) + (-0.5) = 0$
Force time product, yaw $+ -0.707 + 0.707 = 0$ b. $Bcp = 1$. Exhaust III on 0.5 units of time, II on 0.5, I on 2. (3 units of time total)
Force time product, pitch $= 0.5 (-0.5) + 0.5 (-0.5) + 2 = 1.5$
Force time product, yaw $= 0.5 (-0.707) + 0.5 (+0.707) = 0$ c. $Bcp = -1$. Exhaust III on 1.5 units of time, II on 1.5, I on 0. (3 units of time total)
Force time product, pitch $= -0.5 (+1.5) -0.5 (+1.5) = -1.5$
Force time product, yaw $= -0.707 (+1.5) + 0.707 (+1.5) = 0$ Using similar procedures to examine yaw, it can be shown that yaw input commands will contribute no energy to the pitch plane and will also consume three units of time each.

It should be noted that there is a slight gain difference between the pitch and yaw planes. Normally, this difference can be tolerated; however, in the event it cannot, a slightly longer time unit can be used for yaw on time to equalize the gain differences.

It should be noted that while the operation of the device has been described in connection with laterally directed jet orifices I, II and III spaced at 120° about the periphery of the rear end of the missile whereby the gas exhausting from the several orifices will provide a direct thrust to move the rear portion of the missile to realign its direction of travel, the same principles are applicable and the invention is equally applicable to a structure wherein the orifices I, II and III are located in the main thrust nozzle to provide secondary injection into the exhaust stream from the motor to change the direction of main jet thrust thus achieving the same realignment of missile direction.

I CLAIM:

1. A missile attitude control system comprising:
a tridirectional fluid amplifier having an inlet and three outlets;
means for supplying high pressure fluid to the inlet of said fluid amplifier;
conduit means connecting said outlets from said fluid amplifier to three exhaust ports located 120° apart around the periphery of said missile adjacent the rear end thereof, the gas eminating from said exhaust ports in a plane orthogonal to the longitudinal axis of said missile;
vent means in said fluid amplifier;
valve means for selectively closing said vent means to direct the gas flow into selected outlets; and
means for controlling said valve means comprising an electronic circuit for sequencing flow through the three exhaust ports into six time intervals in equal cycle times, three for controlling pitch and three for controlling yaw.

2. A missile attitude control system as set forth in claim 1 wherein, said sequencing means includes means for varying the length of the on time interval for each of the six intervals within a constant cycle time.

* * * * *